United States Patent [19]
Brightman et al.

[11] 3,727,419
[45] Apr. 17, 1973

[54] REFRIGERATOR CONTROL CIRCUIT

[75] Inventors: Ben W. Brightman, Clarence C. Clarke, both of Evansville, Ind.

[73] Assignee: Whirlpool Corporation, Benton Harbor, Mich.

[22] Filed: June 16, 1971

[21] Appl. No.: 153,562

[52] U.S. Cl. ..........................62/155, 62/202, 62/226, 62/228
[51] Int. Cl. ................................................F25d 21/06
[58] Field of Search........................62/202, 155, 157, 62/226, 227, 228, 229, 231

[56] References Cited

UNITED STATES PATENTS

| | | | |
|---|---|---|---|
| 1,978,709 | 10/1934 | Hill | 62/202 |
| 2,498,864 | 2/1950 | Root | 62/202 |
| 2,780,924 | 2/1957 | Latter | 62/202 |
| 3,105,364 | 10/1963 | O'Connell | 62/202 |

*Primary Examiner*—Meyer Perlin
*Attorney*—James S. Nettleton et al.

[57] ABSTRACT

A refrigerator having a control thermostat disposed in the refrigerated chamber. The refrigerator control includes a motor driven defrost timer. The motor of the timer is disposed in heat transfer association with the temperature responsive means of the thermostat. The thermostat and timer may be disposed in a space defined by a wall means forming a control console.

11 Claims, 4 Drawing Figures

PATENTED APR 17 1973　　　　　　　　　　　　　　3,727,419
FIG.1
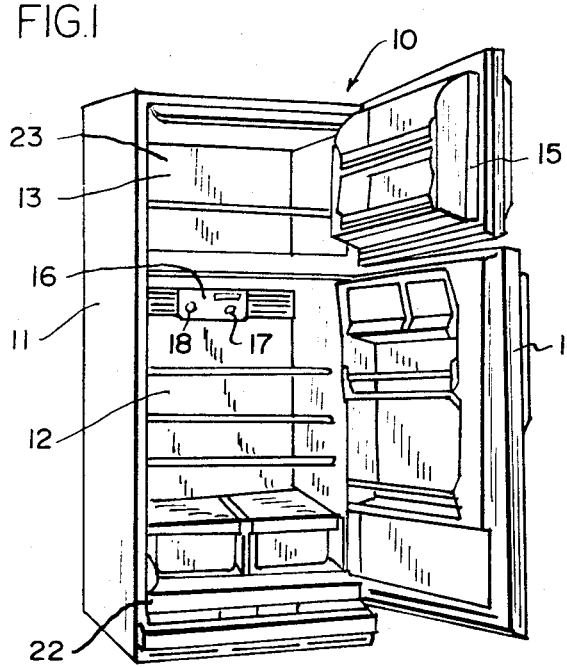
FIG.2
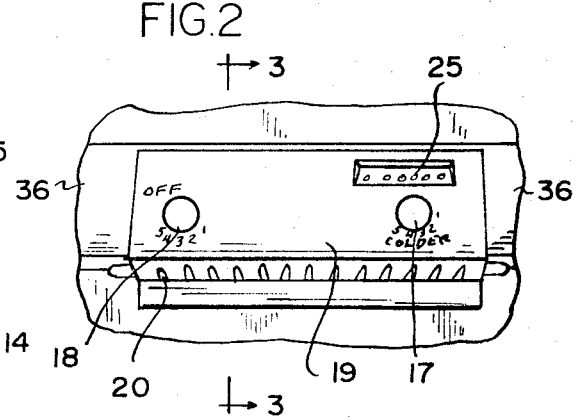
FIG.4
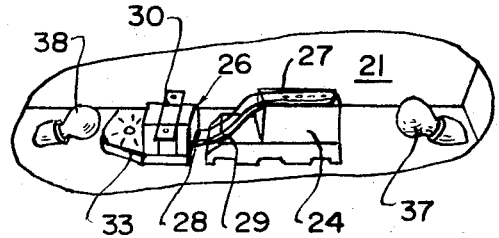
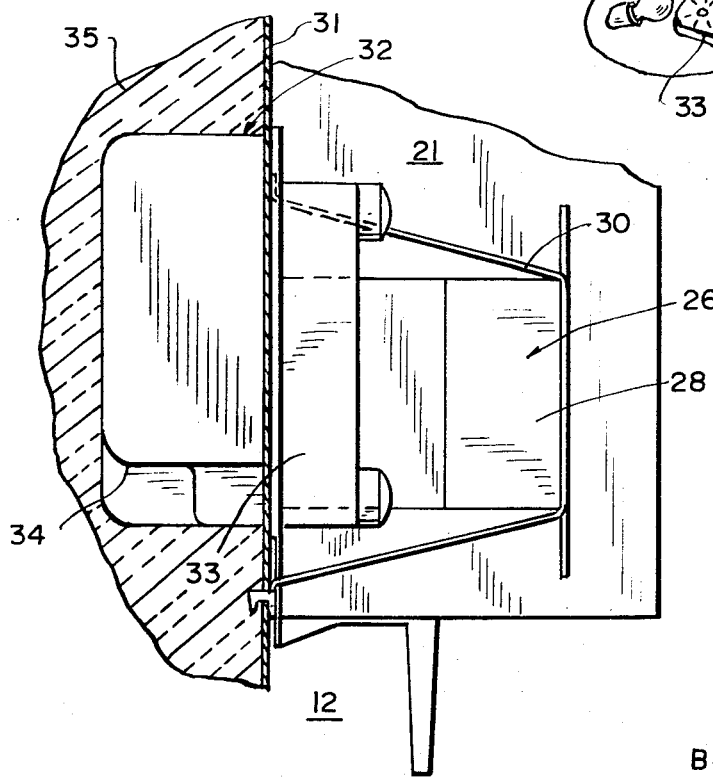
FIG.3
INVENTORS.
BEN W. BRIGHTMAN
CLARENCE C. CLARKE
BY Hofgren, Wegner, Allen,
Stellman & McCord.
ATTORNEYS.

REFRIGERATOR CONTROL CIRCUIT

BACKGROUND OF THE INVENTION

1. Field of the Invention

This invention relates to refrigeration devices and in particular to refrigerator controls.

2. Description of the Prior Art

In one conventional form of refrigerator, a control thermostat is mounted in the refrigerated chamber for sensing the temperature thereof and controlling the operation of the refrigeration apparatus in accordance therewith. The thermostat includes a sensing element and a portion responsive to the temperature sensed by the sensing element to control the operation of the refrigeration apparatus.

At times, false operation of the thermostat occurs due to the temperature responsive portion of the thermostat being colder than the sensing portion thereof. Such malfunctioning causes excessively long refrigeration off cycles which result in subsequent excessively long cooling cycles which may result in overheating of the refrigeration apparatus and undesirable temperature variations from maximum to minimum in the refrigerated chambers.

One attempted solution to this undesirable extended refrigeration cycle malfunctioning has been to provide heating elements adjacent the thermostat which may be energized from time to time thereby to maintain the sensing element warm so as to increase the running time of the refrigerator such as where the door to the refrigerator is opened more frequently. Thus, in such controls, the heating element is energized as a function of the opening of the refrigerator door.

Operation of the refrigeration apparatus may cause frosting of the refrigerated compartment reducing the efficiency of the operation of the apparatus. Defrost timers have been conventionally employed to effect a suitable defrosting of the refrigerator chamber from time to time. Such defrost timers have been conventionally installed in the machinery compartment of the refrigerator necessitating substantial wiring and concomitant manufacturing expense relative to interconnections with associated elements of the refrigeration apparatus. In one form of improved refrigerator, the defrost timer is located in the refrigerated compartment or in a wall portion of the compartment, providing access from the interior of the compartment.

SUMMARY OF THE INVENTION

The present invention comprehends an improved refrigeration apparatus eliminating the disadvantages of the above-discussed prior art refrigeration apparatuses and providing an improved functioning thereof in a novel and simple manner. More specifically, the present invention comprehends utilizing heat from the defrost timer motor to prevent the temperature responsive portion of the control thermostat from being colder than the temperature sensing portion thereof. The invention comprehends locating the defrost timer in the refrigerated compartment adjacent the thermostat to provide desirable heat transfer association therebetween to effect such improved functioning of the control thermostat.

More specifically, the defrost timer may be incorporated as a portion of the control console provided in the refrigerated compartment which includes the control thermostat means for controlling the air flow through the compartment, and illumination means for illuminating the interior of the refrigerated compartment such as when the door is opened. The control console includes a control panel which defines a space in which the defrost timer and thermostat are disposed. The illumination means may also be disposed in this space for augmenting the heat delivered to the thermostat by the timer motor, upon opening of the refrigerator door.

Location of the timer motor in the refrigerated chamber provides extended life thereof because of the lower ambient temperature operating conditions. The operation of the refrigeration means and the location of the timer motor are coordinated to assure that the temperature of the motor is maintained above the dew point to effectively preclude moisture condensation thereon.

The timer motor may comprise a continuously operating motor so as to provide heat to the thermostat temperature responsive means substantially at all times. The wattage of the timer motor is preferably relatively small so as to minimize the heat dissipation to the refrigerated chamber while yet providing sufficient thermal energy to the thermostat temperature responsive means to eliminate undesirable cross-ambient malfunctioning thereof.

BRIEF DESCRIPTION OF THE DRAWING

Other features and advantages of the invention will be apparent from the following description taken in connection with the accompanying drawing wherein:

FIG. 1 is a perspective view of a refrigeration apparatus having a control embodying the invention;

FIG. 2 is a fragmentary perspective view of the control console thereof;

FIG. 3 is a fragmentary enlarged vertical section taken substantially along the line 3—3 of FIG. 2; and FIG. 4 is a fragmentary perspective view of the control with the console cover removed.

DESCRIPTION OF THE PREFERRED EMBODIMENT

In the exemplary embodiment of the invention as disclosed in the drawing, a refrigerator generally designated 10 is shown to comprise a cabinet 11 defining a fresh food refrigerated chamber 12 and a freezer chamber 13 selectively closable by doors 14 and 15, respectively. In the rear of refrigerator chamber 12 is mounted a control console 16 which may include a manually operable air control knob 17 and a manually operable temperature control knob 18 for adjustment by the user. The control console includes a wall element, or panel, 19 provided with suitable apertures 20 for exposing the space 21 therein to the ambient atmosphere of the compartment 12.

Cabinet 11 further defines a lower portion 22 in which the conventional refrigeration apparatus, such as the refrigerator compressor and condenser (not shown) are located. The evaporator (not shown) of the refrigeration apparatus may be disposed in the rear portion 23 of the cabinet and refrigerated air may be delivered from the evaporator through a suitable air duct 24 terminating in an outlet 25 opening to chamber 12.

Control of the refrigeration apparatus is effected by a suitable thermostat generally designated 26 having a sensing element portion 27 and a temperature responsive portion 28. Any suitable thermostat may be utilized within the scope of the invention and in the illustrated embodiment, temperature responsive portion 28 defines a bellows actuator with the temperature sensing portion 27 comprising a conventional bulb connected to the bellows by a capillary tube 29. As shown in FIG. 3, the temperature responsive portion 28 of the thermostat is carried on a suitable bracket 30 mounted on the liner 31 of cabinet 11 defining refrigerated space 12. The invention comprehends mounting the defrost timer, generally designated 32, adjacent the thermostat in heat transfer association with the temperature responsive portion 28 thereof. The defrost timer includes an electric motor 33 which is juxtaposed rearwardly to the thermostat temperature responsive portion 29 to be in heat transfer association therewith. Timer 32 may comprise a conventional timer housed in a suitable container 34 disposed in the rear wall 35 of cabinet 11. The timer herein is arranged to be operated continuously whereby heat is delivered from the motor 33 continuously to the thermostat portion 28 for preventing undesirable excessive low temperature of the thermostat portion 28 to avoid undesirable long off and on cycles of operation of the refrigeration apparatus as may occur with conventional thermostat control arrangements.

Control console panel 19 may include translucent side portions 36 behind which may be mounted suitable illumination devices, such as incandescent lamps 37 and 38, at opposite ends of console space 21. Lamps 37 and 38 may be suitably connected in association with the refrigeration apparatus control to be energized whenever door 14 is opened. Lamp 38 is disposed adjacent thermostat 26 so as to augment the heating of the temperature responsive portion 28 thereof effected by the motor 33, whenever the refrigerator door is opened.

Thus, thermostat 26 and defrost timer motor 33 are effectively disposed in the refrigerated chamber 12 and more specifically, within space 21 thereof defined by the control console panel 19 to provide improved control functioning in refrigeration apparatus 10. The timer motor is disposed suitably so as to prevent the temperature of the motor from dropping below the dew point of air circulated through chamber 12 to preclude undesirable moisture condensation on the motor. Console panel 19 effectively traps heat from the timer motor and illumination device 38 so as to retain the thermal energy adjacent the temperature responsive means 28 of the thermostat suitably to provide the desired heat transfer thereto. The panel 19 may be readily removably installed so as to permit facilitated access to the thermostat and timer through chamber 12 when desired such as for maintenance purposes.

As the defrost timer 32 is installed adjacent the thermostat 26, substantial reduction in wiring is obtained facilitating manufacture and substantially reducing the cost of refrigeration apparatus 10 while yet providing the improved functioning discussed above. The mounting of the timer motor 33 so as to be cooled by the refrigerated air of chamber 12 substantially extends the useful life thereof as a result of the low operating ambient temperature. Further, by providing the timer motor 33 at the upper rear portion of chamber 12, the heat energy produced thereby may further serve to warm this portion of the cabinet which will reduce condensation on and dripping of moisture from cold surfaces when the door 14 is opened. The cold surfaces present a problem in conventional refrigerators at this area. The heat from motor 33 serves to alleviate this minimum temperature condition for improved operation of the refrigeration apparatus.

The foregoing disclosure of specific embodiments is illustrative of the broad inventive concepts comprehended by the invention.

Having described the invention, the embodiments of the invention in which an exclusive property or privilege is claimed are defined as follows:

1. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, and a motor mechanically driving another device in said refrigeration device and disposed adjacent said temperature responsive means in thermal transfer association therewith, whereby energy losses produced by said operation of said motor additionally cause heating of said temperature responsive means.

2. The structure of claim 1 wherein said motor is energized continuously.

3. The structure of claim 1 wherein said refrigerating means and location of said motor are coordinated to assure that the temperature of the motor is above the dew point of the chamber air circumjacent the motor to preclude undesirable moisture condensation on said motor.

4. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, and a motor disposed adjacent said temperature responsive means in thermal transfer association therewith, whereby operation of said motor causes heating of said temperature responsive means, said motor comprising the drive motor of a timer for timing cyclical operation of the refrigerating means.

5. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, and a motor disposed adjacent said temperature responsive means in thermal transfer association therewith, whereby operation of said motor causes heating of said temperature responsive means, said motor comprising the drive motor of a defrost timer for timing a defrost operation of the refrigerating means.

6. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, a motor mechanically driving another device in said refrigeration device and disposed adjacent said temperature responsive means in thermal transfer association therewith, whereby energy losses produced by said operation of said motor additionally cause heating of said temperature responsive means, and wall means adjacent said motor and temperature responsive means for causing heat developed by operation of said motor to be retained adjacent said temperature responsive means.

7. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, a motor disposed adjacent said temperature responsive means in thermal transfer association therewith, whereby operation of said motor causes heating of said temperature responsive means, and wall means adjacent said motor and temperature responsive means for causing heat developed by operation of said motor to be retained adjacent said temperature responsive means, said wall means substantially enclosing the space in which said temperature responsive means and motor are disposed.

8. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, a motor disposed adjacent said temperature responsive means in thermal transfer association therewith, whereby operation of said motor causes heating of said temperature responsive means, and wall means adjacent said motor and temperature responsive means for causing heat developed by operation of said motor to be retained adjacent said temperature responsive means, said wall means substantially enclosing the space in which said thermostat device and motor are disposed.

9. The structure of claim 8 wherein said wall means defines an apertured portion for conducting refrigerated air from said chamber to said space.

10. In a refrigeration device defining a chamber and means for refrigerating said chamber, a thermostat device having a temperature sensing element and means responsive to temperature sensed by said element for controlling operation of the chamber refrigerating means, each of said sensing element and temperature responsive means being disposed in the refrigerated chamber, a motor disposed adjacent said temperature responsive means in thermal transfer association therewith, whereby operation of said motor causes heating of said temperature responsive means, and illumination means adjacent said temperature responsive means in thermal transfer association therewith for augmenting the heating of said temperature responsive means as an incident of operation of said illumination means.

11. The structure of claim 10 further including wall means adjacent said illumination means and temperature responsive means for causing heat developed by operation of said illumination means to be retained adjacent said temperature responsive means.

* * * * *